United States Patent
Olson

[15] 3,693,657
[45] Sept. 26, 1972

[54] FLOW RESTRICTOR WITH FLUSHING MEANS

[72] Inventor: Donald O. Olson, 5885 Dartmouth, Chula Vista, Calif. 92010

[22] Filed: Dec. 10, 1970

[21] Appl. No.: 96,883

[52] U.S. Cl. ............137/608, 138/43, 251/126
[51] Int. Cl. ........F16k 47/00, F15d 1/04, F17d 1/10
[58] Field of Search ..........137/608; 251/126; 138/43

[56] References Cited

UNITED STATES PATENTS

| 2,833,311 | 5/1958 | Baldelli | 138/43 |
| 3,337,180 | 8/1967 | Carlton | 138/43 X |
| 1,957,828 | 5/1934 | Greenwald | 138/43 X |
| 2,840,096 | 6/1958 | Du Bois | 138/43 X |
| 3,148,703 | 9/1964 | Kachline | 137/608 |
| 3,150,686 | 9/1964 | Kachline | 137/608 |
| 3,461,833 | 8/1969 | Boyadjieff | 137/608 X |
| 3,554,229 | 1/1971 | Coyle | 137/608 |

Primary Examiner—Samuel Scott
Attorney—Herzig & Walsh

[57] ABSTRACT

A flow restricting device with means for flushing particularly adapted as a dripper to provide a slow drop flow for use in irrigation. Two tapered telescoping members are provided, the inner one having a helical groove providing a restricted passageway between it and the outer member. By moving the tapered members axially, free flow is provided for between them for flushing.

6 Claims, 5 Drawing Figures

PATENTED SEP 26 1972 3,693,657
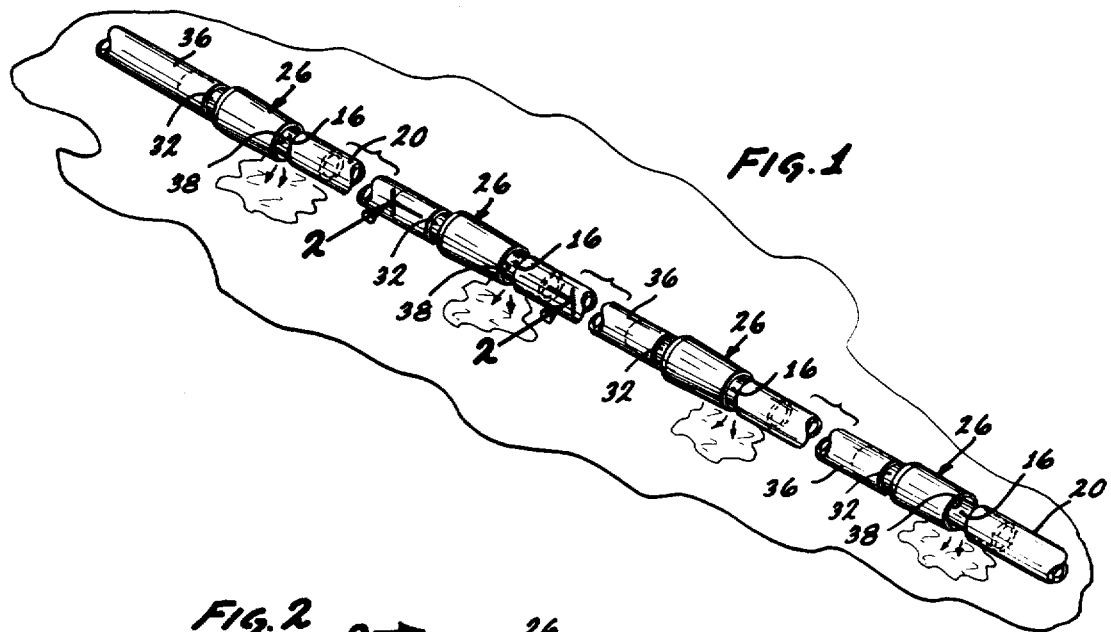
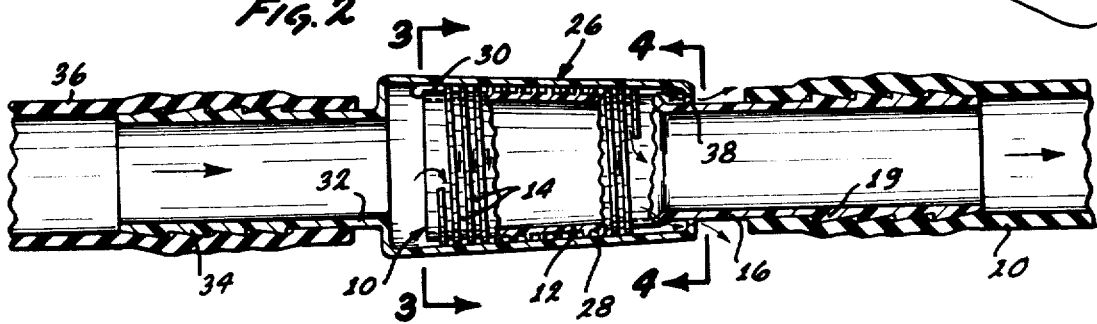
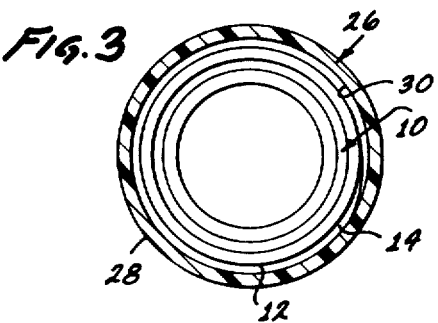
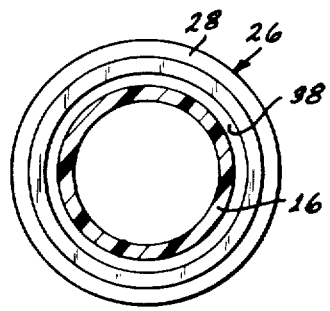
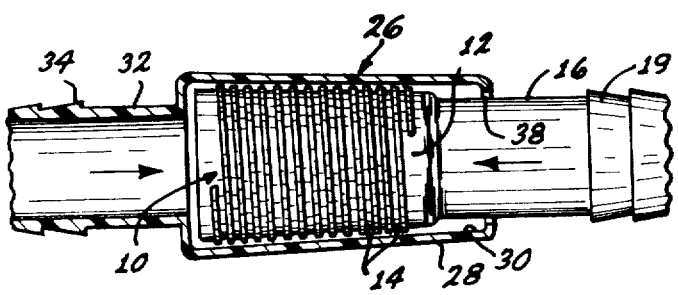
INVENTOR
DONALD O. OLSON
BY Herzig & Walsh
ATTORNEYS

FLOW RESTRICTOR WITH FLUSHING MEANS

SUMMARY OF THE INVENTION

The invention is a fluid flow restricting device providing for a slow restricted or drip flow of fluid particularly adapted for use for irrigation purposes. The device can be readily fabricated from plastic or other suitable materials. A plurality or multiple of the devices are connected in series in a water line that may be laid on the ground, the devices being spaced apart to provide a drip flow of water for irrigation purposes.

In a preferred form of the invention, it comprises two generally cylindrical telescoping parts with a helical groove formed in the inner member to provide an elongated restricted channel between the members when telescoped together. The outlet from the restricted flow is a narrow annular space between the two members. The two members have a taper and are movable axially relatively to provide an annular space between the annular groove and the inside surface of the outer member, which relieves the restriction and allows for free flow for flushing.

A primary object of the invention is to provide an improved and simplified flow restricting device as referred to particularly adapted for use as a flow control dripper for use in irrigation.

A further object is to provide a device of this type uniquely constructed to provide for quick release of the restriction and flushing through the device to clear any clogging or obstruction.

A further object is to provide a device of this type formed of tapered telescoping members with a helical groove formed in a surface of one of them to provide the restricted flow channel and the members being moved axially to release the restriction.

BRIEF DESCRIPTION OF THE DRAWINGS

Further objects and additional advantages of the invention will become apparent from the following detailed description and annexed drawings, wherein:

FIG. 1 is a pictorial view illustrating utilization of the device in irrigation systems;

FIG. 2 is a cross sectional view of a preferred form of the device;

FIG. 3 is a sectional view taken along line 3—3 of FIG. 2;

FIG. 4 is a sectional view taken along line 4—4 of FIG. 2; and

FIG. 5 is a view similar to that of FIG. 2 showing the device in released position.

DESCRIPTION OF THE PREFERRED EMBODIMENT

Referring now more particularly to the drawings, which show a preferred form of the device, it comprises an inner generally cylindrical tubular member 10 having a tapered part 12 in which is formed a helical groove 14 as shown on the tapered surface. Member 10 has a cylindrical tubular part 16 having a ribbed portion 19 for coupling to a flexible hose 20.

Numeral 26 designates another part which is generally cylindrical and tubular having a tapered part 28 with an inner surface 30 which is adjacent to the helical groove 14. This part has a cylindrical tubular end portion 32 which has ribs 34 adapted also for coupling to a flexible hose 36. Portion 16 of part 10 passes through opening or bore 38 in the end of part 26. Flow through the parts is indicated by the arrows.

The two members 10 and 26 are relatively movable axially. Normally, the tapered grooved surface on the inner member is flush against the tapered surface 30 of the outer member and some of the incoming liquid must traverse the elongated passageway provided by the helical groove and this, of course, restricts and limits the rate of flow. The liquid that has passed through the groove passes out of the device through the small annular space between the part 16 of the inner member and bore 38 of the outer member. Because of the restriction a reduced flow or drip takes place. When the members 10 and 26 are moved axially as illustrated in FIG. 5, the tapered surfaces separate so that an annular space is formed between these surfaces leaving an annular space between them which relieves the restriction and allows for free flow through the device and out of the annular space between the part 16 and bore 38. Thus, in the event of any clogging or obstruction occurring in the device, by simply manually moving the parts axially relatively, the restriction is released and the device flushes itself out. The two members are then repositioned into the position shown in FIG. 2 and it again acts as a restrictor, the pressure of the incoming liquid holding the parts in this position.

In a preferred form of the invention, the parts may be fabricated from plastic by simple fabrication and production means so that the device can be manufactured extremely inexpensively. FIG. 1 illustrates a preferred utilization of the device, this figure showing a plurality or multiple of the device coupled into a flexible hose line with the devices spaced apart as shown. The hose line with the flow restrictors in it may be simply laid on the ground in an area that is to be irrigated and a steady drip flow from the hose line is provided from each device for irrigation purposes.

From the foregoing, those skilled in the art will readily understand the nature of the construction and utilization of the invention and the manner in which it achieves and realizes all of the objects as set forth in the foregoing.

The foregoing disclosure is representative of a preferred form of the invention and is to be interpreted in an illustrative rather than a limiting sense.

What is claimed is:

1. A device providing for a restricted fluid flow comprising: tubular telescoping relatively slidable members; means providing, in one position of said members, an elongated restricted path for flow of fluids in an axial direction between the members and providing a flow path from the interior of said members to an outlet leading to the exterior thereof, said members being constructed to be movable axially a relatively small amount to a second position while still telescoped and being relatively shaped whereby to provide a relatively wide space for substantially unrestricted free flow of fluid between the members, from the interiors thereof to said outlet whereby to flush the device.

2. A device as in claim 1, wherein the restricted path of flow is formed by a helical channel provided in one of the members.

3. A device as in claim 1, wherein the said members are generally cylindrical, the outlet from the device being in the form of an annular space between them, allowing for drip of fluid that has traversed the restricted passageway.

4. A device as in claim 1, including means provided for coupling of a fluid line to each end of the device.

5. A device as in claim 1, wherein both of the members are tapered whereby axial relative movement between the members increases the space between them.

6. A device as in claim 5, wherein the restricted path comprises a channel formed between convolutions of a helical thread on the tapered part of the inner member.

* * * * *